United States Patent [19]

Wolcott et al.

[11] 4,346,022

[45] Aug. 24, 1982

[54] METHOD AND APPARATUS FOR PREPARING LEAD-ACID BATTERY PASTES

[75] Inventors: Edward O. Wolcott; Frank W. Wentzel, Jr., both of Gainesville, Fla.

[73] Assignee: General Electric Company, Gainesville, Fla.

[21] Appl. No.: 30,039

[22] Filed: Apr. 13, 1979

[51] Int. Cl.$^3$ .............................................. H01B 1/06
[52] U.S. Cl. .................. 252/509; 429/228; 141/1.1; 252/506; 252/518; 252/512
[58] Field of Search ................ 429/228, 225; 252/506, 252/509, 518, 521, 512; 204/290 R, 291–293, 2.1, 53, 174; 141/1.1

[56] References Cited

U.S. PATENT DOCUMENTS

| | | | |
|---|---|---|---|
| 3,819,414 | 6/1974 | Taylor | 429/228 |
| 3,881,952 | 5/1975 | Wheadon et al. | 429/225 |
| 3,926,670 | 12/1975 | Taylor et al. | 429/228 |
| 4,188,268 | 2/1980 | Sugahara et al. | 429/228 |
| 4,200,683 | 4/1980 | Bant | 429/225 |

*Primary Examiner*—Joseph L. Schofer
*Assistant Examiner*—J. L. Barr
*Attorney, Agent, or Firm*—Morgan, Finnegan, Pine, Foley & Lee

[57] ABSTRACT

A method and apparatus for preparing battery paste for battery plate grids which includes the steps of feeding measured quantities of lead powder, water and dilute sulfuric acid to a power driven mixer, measuring the power input to the power mixer drive and adding water to the mixture until the power input is at a predetermined value. The apparatus includes a stationary mixer, an agitator in the mixer, a power drive for the agitator and power measuring means for measuring the power input to the power drive for moving the agitator through the paste mixture.

9 Claims, 4 Drawing Figures

FIG. 3A is a schematic block diagram of a subsystem of the invention and suitable for automatically controlling viscosity.

Referring to FIGS. 1 and 2, the mixer apparatus to which the invention is adapted includes frame 2 having mounted in fixed position thereon electrical motor 4 and stationary mixer housing 6. A three horsepower, three phase, 460 volt, A.C. motor having a constant speed of 870 R.P.M. has been found to be suitable as the mixer motor in practicing the instant invention.

Shaft 8 of motor 4, through reduction gear 10, drives pulley 12 which, by belt 14, is connected to pulley 16 keyed to drive shaft 18 of mixer drum 20 in stationary mixer housing 6. Drive shaft 18 is mounted for rotation in the bottom of housing 6, in thrust bearing-seal 22. Thrust bearing-seal 22 prevents the leakage of lead dust and paste mixture from mixture housing 6.

Mixer drum 20, open at its top 26 and closed and fixed at its bottom 28 to drive shaft 18, is mounted co-axially with the center of stationary mixer housing 6 for rotation in the stationary mixer housing. Mixer drum 20, for reasons more apparent later herein, has mounted thereon vents 30, 32, 34, opening at their bottoms into stationary mixer housing 6 and venting the interior of mixer housing 6 with the interior of drum 20 and, through vent tube 36 in stationary mixer housing cover 38, to the atmosphere or plant vent system. Cover 36 is provided with a door 40, hinged at 42 and, with seal 44, forming an airtight closure when closed, a liquid input pipe 46, having a valve 48, and a second liquid input pipe 50, having a valve 52, all for purposes more apparent later herein.

Scraper blade 60, extending longitudinally along and in close proximity to the vertical inner wall of stationary mixer housing 6, is mounted at one end of support strut 62 fixed by plate 64 to mixer drum 20 for rotation therewith. Thus, as mixer drum 20 is rotated by motor 4 and drive shaft 18 in the counter-clockwise direction of the arrow, FIG. 2, scraper blade 60 sweeps the inner vertical wall of stationary mixer housing 6, for purposes more apparent later herein.

Main mixer blade 70 is fixed by plate 72 to mixer drum 20 for rotation therewith and is angularly disposed in the counter-clockwise direction of rotation of mixer drum 20, as shown by the arrow, FIG. 2, with its leading edge 74 in close proximity to the bottom wall of stationary mixer housing 6, its trailing edge 76 elevated and its outer edge 78 in close proximity to the vertical inner wall of mixer housing 6.

Auxiliary mixer blade 80 is fixed by plate 82 to mixer drum 20 for rotation therewith through a path above the path of rotation of main mixer 70 and is angularly disposed in the direction of rotation with its leading edge 82 depressed and its trailing edge 84 elevated.

For purposes later described, mixer housing 6 is provided with a water jacket 90 having an inlet 92 and an outlet 94.

Turning now to the simplified schematic of FIG. 3, the manner in which the power input to the mixer is monitored and controlled can be understood. As already noted, the power input to the mixer motor is a measure of the power delivered to the mixer by the motor shaft. This, in turn, is a measure of the viscosity (consistency) of the paste—this property being that over which control (reproducability) is desired.

From the manufacturing point of view, it is not essential that the motor output power (torque) be known (although this could be computed or electronically derived from the power and speed data available). What is important is that empirically determined satisfactory results be reproducible from one mixture batch to the next. Thus, once the physical behavior of the paste is fixed by defined criteria for satisfactory performance (spreadability, setting time, electrical performance, etc.), it is required only that this behavior can be achieved time after time, within prescribed limits. Monitoring of the power input and adjusting the water quantity in the mixture are two means by which consistent satisfactory results are obtained in accordance with the invention.

FIG. 3 illustrates the few basic components required, the motor M being the motor which drives the mixing blades of the mixer 6. In the preferred embodiment of the invention, motor 4 is a three-phase motor rated at 3 hp and having a speed of 870 rpm. It is supplied with power from an available 3-phase source through lines $L_1$, $L_2$ and $L_3$ protected by fuses $F_1$, $F_2$ and $F_3$. All information necessary for the determination of input power is obtained from the electrical input lines $L_1$, $L_2$ and $L_3$. Specifically, signals representing the phase voltage and line currents are fed to a power monitor 100 whose outputs are analog and digital signals representing an internally computed quantity proportional to the input power: $P_{in} = \sqrt{3}\, E_L I_L \cos\theta -$, where $\cos\theta$ is the power factor and $E_L$ and $I_L$ are phase voltage and line current, respectively.

Line current signals are provided by transducers $T_1$, $T_2$, connected in series with lines $L_1$, $L_2$ so as to develop low level voltage signals fed over conductor pairs 102 and 103 to the appropriate signal inputs to power monitor 100. Voltage signals are provided directly by conductor $L_1$, $L_2$, $L_3$ which feed the phase voltages directly to the power monitor. Since in the three phase system shown $I_1 + I_2 + I_3 = 0$, a measurement of $I_1$ and $I_3$ enables computation of $I_2$, whis being accomplished electronically by the power monitor. Likewise, the power factor is computed from signals developed by a phase detector internal to the power monitor.

The power monitor is a self-contained commercial instrument which computes internally the power input to the motor M from the signal inputs described above. It provides at its output analog signals which may be applied to auxillary devices such as the strip chart recorder 105 in FIG. 3 or to other units or combinations such as the subsystem of FIG. 3A, described below, for automatically controlling water addition to the mixer. One example of such an instrument is the Valenite Power Monitor which is designed to accurately (within ±2% of full scale range) measure and display power consumption over selectable ranges. This instrument in conjunction with the Valenite "ISO-WATT" power transducers ($T_1$, $T_2$) monitors the voltage and current of the AC motor and displays the resulting power (horsepower or kilowatts) being consumed. The low level output signals from the transducers $T_1$, $T_2$ are connected to the power monitor which converts the signals to a power (horsepower or kilowatt) readout. This readout is a 3½ digit light emitting diode display.

The power displayed by the readout is continuously compared to a "limit" value which can be preset by a limit thumbwheel located on its front panel. If at any time the power reading exceeds the "limit" setting, an AC output is immediately turned on. This output, if desired, can be used to control system elements. The limit output is inhibited during a normal start-up surge

METHOD AND APPARATUS FOR PREPARING LEAD-ACID BATTERY PASTES

This invention relates to lead-acid batteries and, more particularly, to a method and apparatus for preparing the pastes for the positive and the negative plates of such batteries.

The positive and negative plates for use in the manufacture of lead-acid batteries are prepared by first providing a grid of lead or alloy of lead, and by then applying to such grid a paste made up from a mixture of dilute sulfuric acid, litharge or red lead, and water. The paste for the positive plate is commonly prepared with litharge and finely divided lead or red lead ($Pb_3O_4$) while the paste for the negative plate is commonly prepared with leady litharge (PbO). In addition to the dilute sulfuric acid, litharge and water, an expanding agent made up of carbon black, lead sulfate, barium sulfate and wood lignin is added as the negative plate paste is mixed so as to expand the paste and provide the desired porosity or sponginess to the negative plate.

The chemical and physical characteristics of the paste affect the bulk of the paste, the amount of active materials present, the handling and application of the paste to the plate grid, the time of setting, the initial capacity of the battery when put in use and, to some extent, the life of the cell or battery. The principal active materials in the positive plate paste are the sulfuric acid, litharge and finely divided lead particles or red lead; in the negative plate paste, the principal active materials are the sulfuric acid, leady litharge and expander. These active materials determine the chemical characteristics of the paste and, thus, are added and mixed in predetermined proportions.

The physical characteristics (e.g., viscosity, spreadability, working time, etc.) of the positive and the negative plate pastes depend upon the properties of the constituents in the paste mixtures. The consistency of those mixtures may be controlled by the amount of liquid and, principally, the amount of water, added to the lead-acid chemical mixture. A consistency of fairly stiff mortar is considered desirable for applying the paste to the plate grids. In mixing the electrode pastes, therefore, consistency (viscosity) is monitored to insure that the mixture has the physical properties sought after for application to the electrode plate grids. In measuring the consistency during mixing it has, heretofore, been the practice to withdraw a sample from the admixture and test the consistency of the sample, either with a penetrometer or by allowing a cylinder of the paste to fall on a plate from a specified height and to then measure the deformation. Both of these methods, however, require the withdrawal of a sample and determine only the static consistency or viscosity. The mixer must be stopped for sample removal and measurement. No provision is made for adjusting the consistency or viscosity, such as by adding water to the mixture, while the measurement is being taken. The control of paste viscosity by static testing is erratic, as static tests yield unreliable predictions of the performance of the paste in dispensing machines. Static tests, for example, are insensitive to minor changes in paste viscosity, which is of substantial importance in the performance of sealed lead-acid batteries.

The present invention avoids the difficulties heretofore encountered in controlling the viscosity of the positive and the negative plate plastes. This is accomplished by mixing the pastes in a motor-driven mixer and by monitoring the horsepower input to the motor, thereby to monitor a quantity directly related to the torque applied to the mixer blades. This torque, in turn, is directly related to the viscosity of the admixture. In this manner viscosity can be continuously monitored and reproducible results achieved by using motor power input as the benchmark quantity. Viscosity is altered by the addition of liquids. That is, dilute sulfuric acid and the lead ingredients are fed to the mixer in predetermined amounts and then water is added to the mixture until a predetermined horsepower or power input to the mixer motor is attained.

In the practice of the invention, it is preferred to first add a predetermined measured weight of the lead powder to the mixer and then add all but 200 to 300 cc water while permitting the mixture of dry powder and water to blend for a period of 4 or 5 minutes. In the case of the negative plate paste, a measured quantity of the expander is fed to the mixture with the dry lead powder, and the two are blended for a minute or so before the water is added.

After the lead powder and water have been mixed for 4 to 5 minutes, a measured quantity of dilute sulfuric acid is added to the mixer. Thereupon the lead powder, water and dilute sulfuric acid are mixed for about an additional 6 minutes. While this mixing is taking place, hot water is fed through the water jacket on the mixer bowl to raise the temperature of the lead powder, water and dilute sulfuric acid blend being mixed in the mixer to a temperature of 150° to 160° F. This assures that the temperature of the mixture reaches at least 140° F. to promote reaction of the lead powder with the dilute sulfuric acid.

After mixing the lead powder, water and dilute sulfuric acid for about 5 to 6 minutes, the power input or horsepower to the mixer motor is noted. In mixing positive paste material, a power input of $1500 \pm 75$ watts, or a horsepower of 2 hp. $\pm 0.1$ hp. has been found to provide the proper paste consistency in the Beardsley Piper Inc., Laboratory Model, Speed Compounder to which the instant invention has been especially adapted. As to the negative plate paste, a power input of 2250 watts $\pm 75$ watts, or a horsepower of 3 hp. $\pm 0.1$ hp. has been found to provide the proper paste consistency in such mixer.

To attain the desired power input level, should the power input level be greater than required after the lead powder, water, dilute sulfuric acid mixture has been mixed for about 6 minutes, 50 cc to 100 cc units of water are added to the mixer, while it is operating. The power input to the mixer motor is allowed to stabilize at a reduced level as the additional water becomes incorporated. This procedure is repeated, if necessary, until the desired predetermined power input level is achieved, thereby indicating the proper viscosity of the mixture. Once the power input stabilizes within the prescribed range, no further addition of water is made and the mixer can be turned off, opened and emptied of paste.

The present invention is more fully described and will be better understood from the following description and examples taken with the appended drawings in which FIG. 1 is a side elevational view, partly in a section, of the apparatus of the instant invention;

Figure 1:
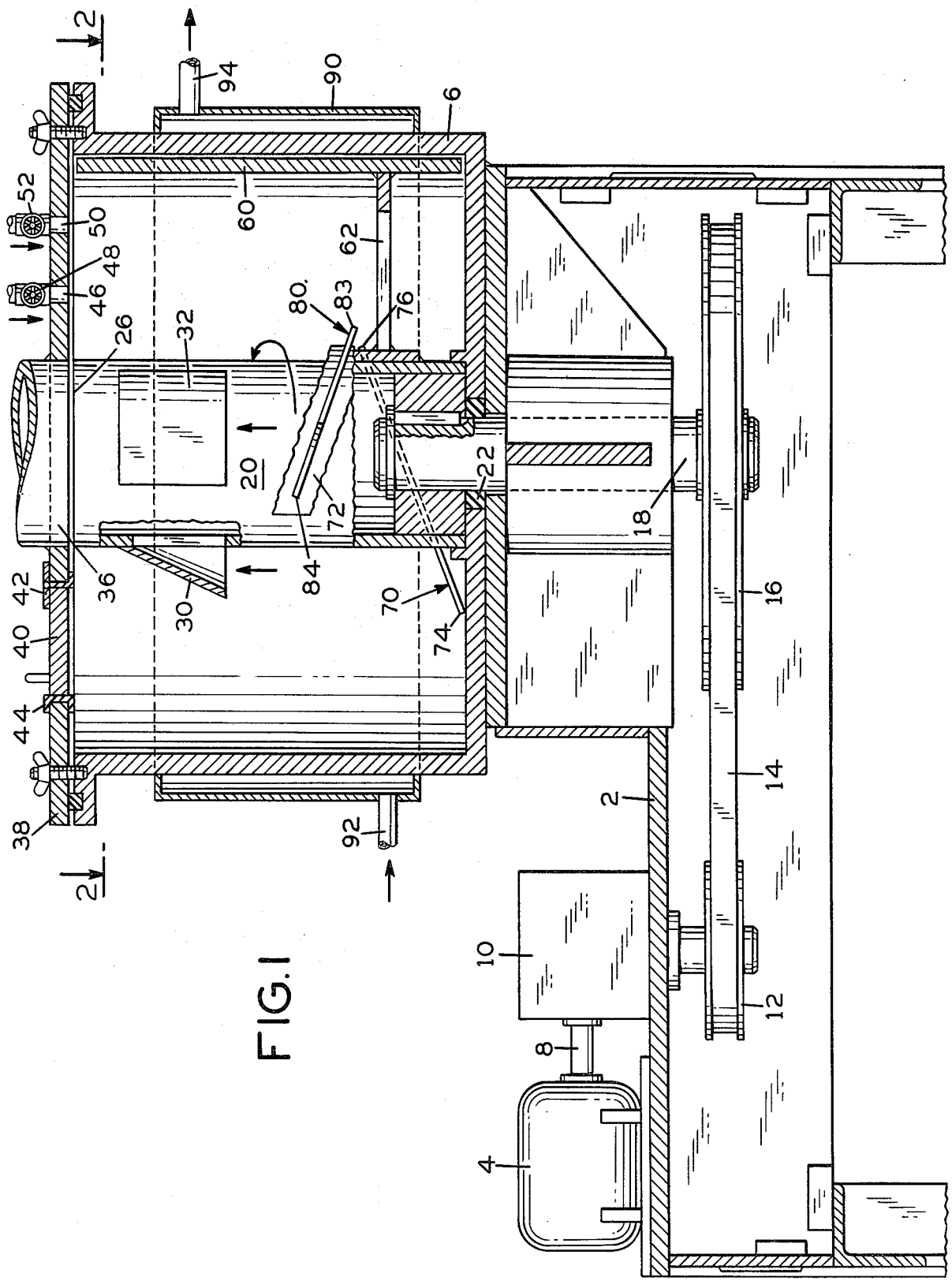
Figure 2:
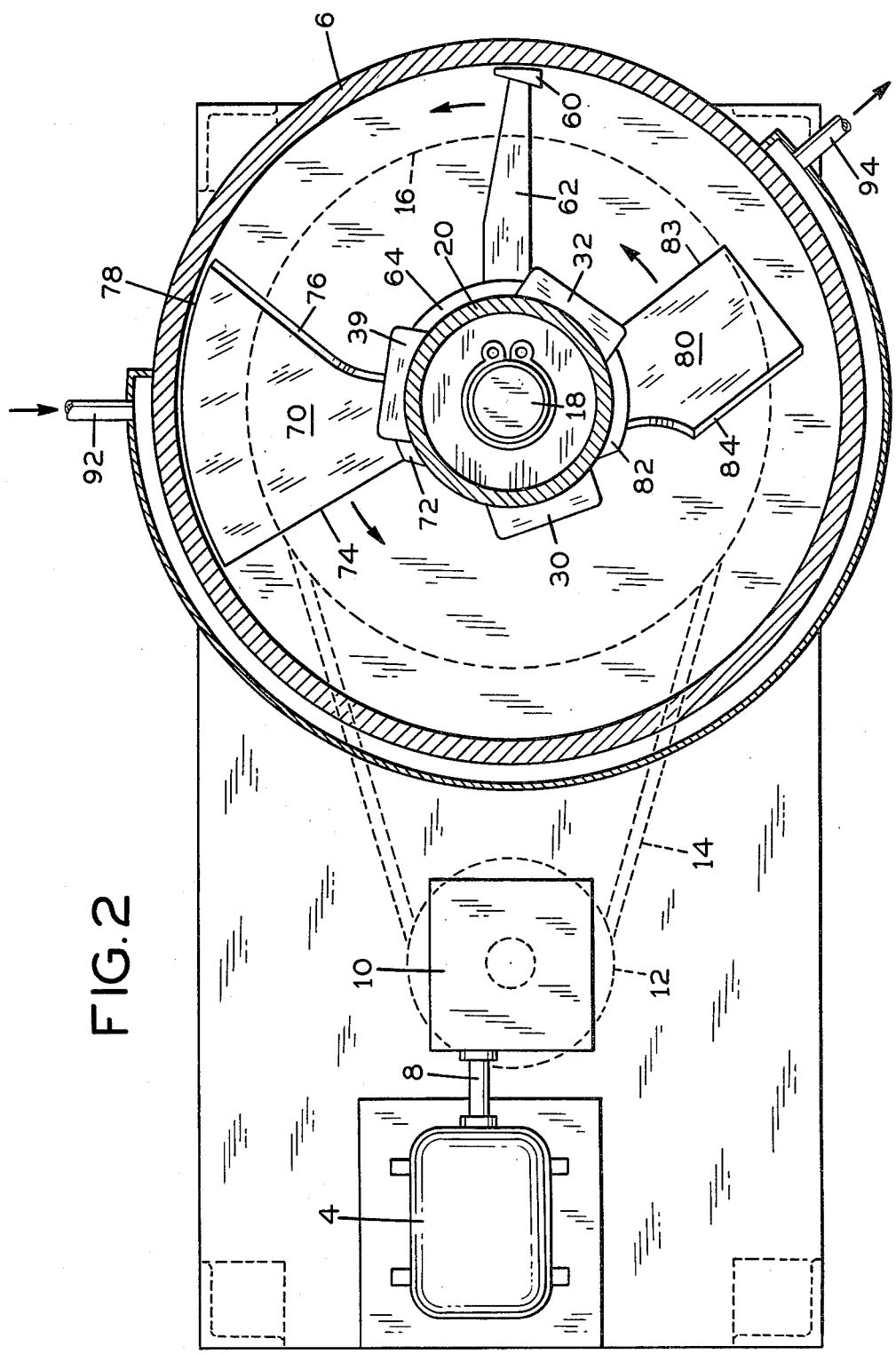
FIG. 2 is a top plan view of the apparatus of FIG. 1.
Figure 3:
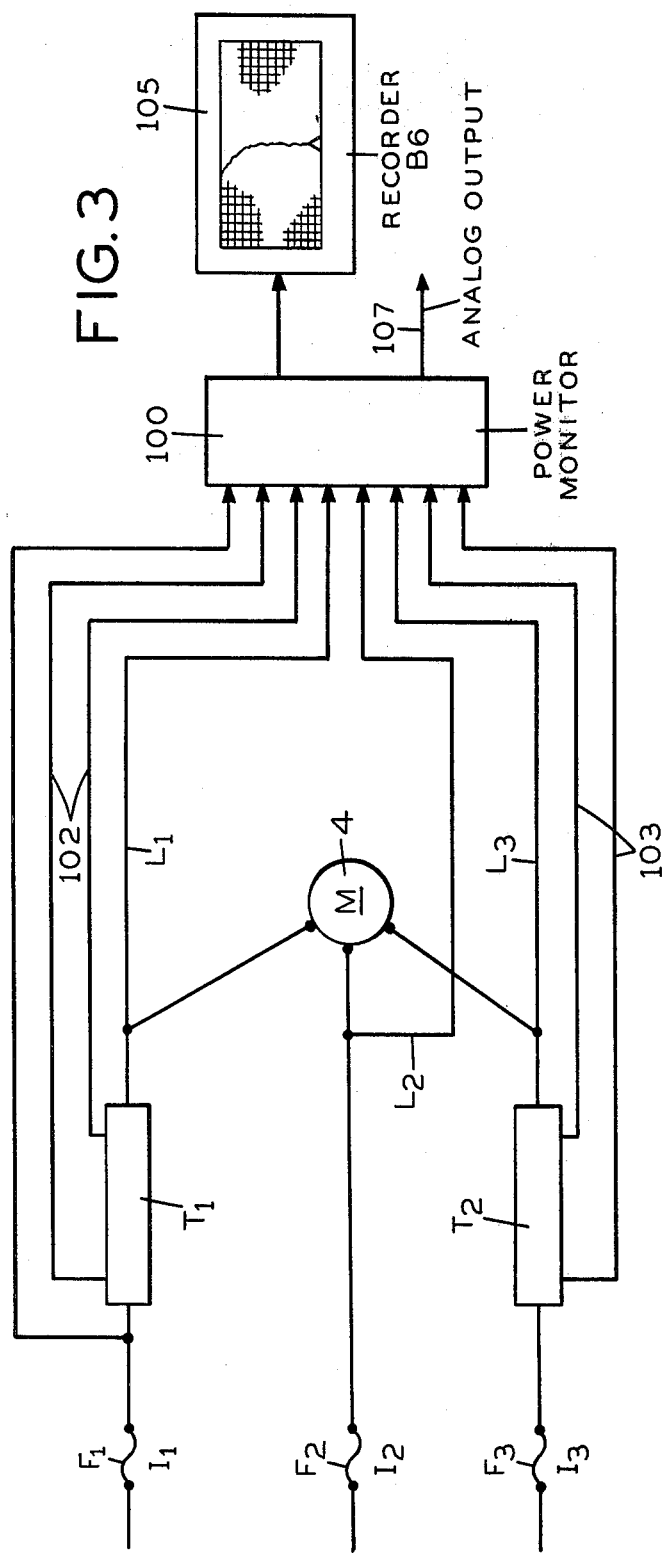
FIG. 3 is an electrical block diagram of the electrical system of the invention; and interval to permit starting in cases where the limit output is used to stop the motor.

The power reading is available as both analog and digital BCD outputs suitable for interfacing with chart recorders, printers, or data acquisition systems. There is also an input offset adjustment which permits the operator to null-out the "no load" or "idle" power readings. In the FIG. 3 system the digital outputs are not employed; instead, one of the analog outputs is applied to strip recorder 105.

The compact ISO-WATT power transducers are mounted in the machine control panel in place of the more bulky current and potential transformers required by conventional power measuring devices. The proper transducer must be selected from the list of standard transducers based on the voltage, number of phases, and the maximum power to be measured. There is a standard "ISO-WATT" transducer compatible with most machine tool motors.

The procedures employed in conjunction with monitoring of the input power have been discussed above. Where the power input monitored registers a value in excess of the predetermined acceptable value, the addition of liquid (water) is required in order to reduce the viscosity. This reduction is sensed as a reduction in the power input as the water becomes incorporated into the mixture in the mixer; water can be metered in slowly for a given time period, or a predetermined quantity (e.g., 50 cc) can be added, "one shot" at a time until such time as the viscosity (as indicated by power input) is reduced to the desired value.

Figure 3A:
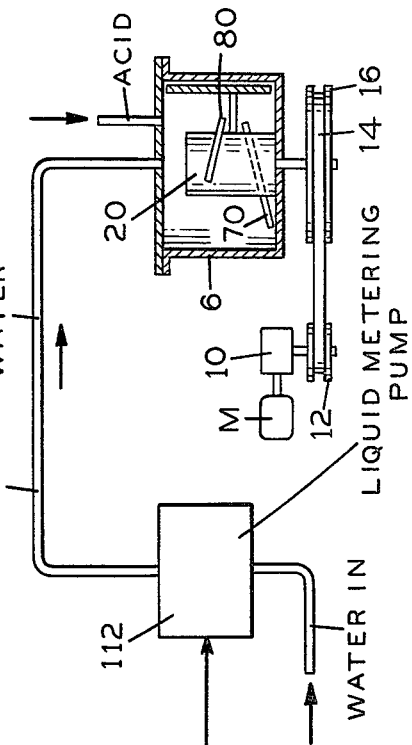

A representative subsystem for automatically adjusting the water content of the mixture is illustrated in FIG. 3A. As shown there, one of the outputs from the power monitor 100 (e.g., the digital output on line 107) may be used to feed a digital/analog controller, such as the Texas Instrument Model 5TI controller 108. Controller 108 develops an analog or digital output (which could be an on/off signal) for operating a liquid pump controller 110. Pump controller 110 is a device which interfaces between the liquid metering pump 112 and controller 108. In certain cases, where the liquid pump is directly compatible with the digital/analog controller, the pump controller may be omitted.

Referring to FIG. 3A, the liquid metering pump operates in response to the outputs of controllers 108 and 110 to vary the quantity or feed rate of water allowed to pass from feed conduit 115 into the mixer tank via water line 116. Since, in the normal situation, mixture viscosity responds rather slowly (i.e., several seconds) to water addition, the 5TI Controller 108 is preferably programmed to generate an output signal to the pump controller only after a predetermined delay following the last addition of water. This delay enables the mixture viscosity to stabilize and be measured automatically before any further water additions are made.

In operation, door 40 in cover 38 is opened and a measured weight of lead powder is fed into mixer housing 6 and door 40 is closed. Where the paste to be mixed is for the negative plate, a measured weight of expanding agent is fed into mixer housing 6 with the lead powder before door 40 is closed. The lead powder and expanding agent are blended with the mixer before the other ingredients are added.

After door 40 is closed, and with hot water, at a temperature of about 150° to 160° F. circulating through water jacket 90, inlet 92 and outlet 94, all but about 200 to 300 cc of the water to be used in the mixture are added to the powder in mixer housing 6 through inlet 46 and valve 48. The powder and water are then blended by the mixer for from about 4 to about 5 minutes and then the measured amount of the dilute sulfuric acid to be used in the paste mixture are added to the powder-water blend. After the powder-water-sulfuric acid materials have been mixed by the mixer for from about 5 to about 6 minutes and the mixed materials have reached the reaction temperature of at least 140° F., the power input to motor 4 is then read at strip chart recorder 105. Additional mixing water is then added to mixer 6, through inlet 46 and valve 48, until the power input to motor 4, as indicated and read at recorder 105, reaches the desired power input level. In adding the additional mixing water to mixer 6, the water is added in a 50 cc unit and the power input, as indicated and read at recorder 105, is allowed to stabilize before an additional 50 cc unit is added. In this manner, the desired mortar consistency or viscosity, as indicated by the motor power input to the mixer, can be attained without the mixture becoming too fluid.

EXAMPLE 1

Following the process and utilizing the apparatus of the present invention, positive plate paste is prepared by feeding 75 lbs. red lead into the mixer and then adding to the red lead in the mixer 4,500 cc of water. After blending the lead powder and water for from about 4 to about 5 minutes, 550 cc of a 40% solution of sulfuric acid is added to the blended lead powder and water and the mixture is heated to a temperature of at least about 140° F. After mixing the blended lead powder and water and the sulfuric acid for about 5 to about 6 minutes at the temperature of about 140° F., the power input to the mixer motor is read and water, in 50 cc units, is added to the mixture. After each water unit addition, the power input to the mixer motor is read and the power input to the motor is allowed to stabilize. This 50 cc unit water addition, power input stabilization is repeated until the power input to the motor is 2 hp ±0.1 hp or 1500 ±75 watts. The mixer is then stopped and the positive plate paste is removed. The total water in such mixture is 4,800 cc.

EXAMPLE 2

Following the process and utilizing the apparatus of the present invention, negative plate paste is prepared by feeding 75 Lbs. of leady litharge and 1½ lbs. of an expander composed of carbon black, lead sulfate, barium sulfate and wood lignin into the mixer and blending the litharge and expander. 3,800 cc of water is then fed into the mixer. After blending the lead-expander powder and water for from about 4 to about 5 minutes, 675 cc of a 40% solution of sulfuric acid is added to the blended powder and water and the mixture is heated to a temperature of at least 140° F. After mixing the blended powder, water and sulfuric acid for about 5 to about 6 minutes at a temperature of about 140° F., the power input to the mixer motor is read and water, in 50 cc units, is added to the mixture. After each water unit addition, the power input to the mixer motor is read and the power input to the motor is allowed to stabilize. This 50 cc unit water addition, power input stabilization is repeated until the power input to the motor is 3 hp ±0.1 hp or 2250±75 watts. The mixer is then stopped and the negative plate paste is removed. The total water in such mixture is 4,200 cc.

The formulations for the positive and negative plate pastes and the power input or horsepower to the mixer motor may, of course, be varied to meet particular lead-acid paste requirements and the desired paste consistency. In any event, the consistency or viscosity of the paste mixture is determined dynamically as the paste is mixed and not statically as in the case of the penetrometer.

The 50 cc units of additional water may be added to the mixer manually or through control 108, pump control 110 and liquid metering pump 112 connected in water inlet line 115 and water outlet line 116 to mixer 6. Power monitor 100 and controller 108 meter the water into mixer 6 in units, for example, 50 cc units, until the power input at recorder 105 is stabilized at the predetermined power input, for example, in the embodiments described 2 hp ±0.1 hp or 1500±75 watts for positive paste and 3 hp ±0.1 hp or 2250±75 watts for negative paste.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A process for preparing paste mixtures for coating plate grids for use in making lead-acid batteries, the steps comprising feeding a measured quantity of lead powder and a measured quantity of water to a mixer, driving said mixer with a motor wherein the power input to said motor is dependent on the viscosity of material being mixed in said mixer, blending said lead powder and water with said mixer, feeding a measured quantity of dilute sulfuric acid to said mixer, while heating the materials in the mixture to a temperature of between about 140° F. and 160° F., monitoring the power input to said motor for determining the viscosity of paste material in said mixer, mixing said blended lead powder and water with said mixer until the power input to said motor stabilizes, and adding water to said materials in said mixer until the power input to said mixer stabilizes at a predetermined value, thereby forming the paste mixture.

2. A process, as recited in claim 1, in which said paste mixture is positive plate paste and said lead powder is red lead.

3. A process, as recited in claim 1, in which said paste mixture is negative plate paste and said lead powder is litharge.

4. A process, as recited in claim 3, in which an expander material composed of carbon black, lead sulfate, barium sulfate and wood lignin is added to said litharge.

5. A process, as recited in claim 2, in which said power input to said mixer motor is stabilized at 2 hp ±0.1 hp when said mixer motor is stopped and said positive plate paste is removed.

6. A process, as recited in claim 4, in which said power input to said mixer motor is stabilized at 3 hp ±0.1 hp when said mixer motor is stopped and said negative plate paste is removed.

7. A process, as recited in claim 5, in which said lead powder is fed to said motor driven mixer in a quantity of 75 lbs. and said sulfuric acid is a 40% solution in the amount of 550 cc.

8. A process, as recited in claim 6, in which said litharge is in an amount of 75 lbs, said expander is in an amount of 1.5 lbs and said sulfuric acid is a 40% solution in the amount of 675 cc.

9. A process for preparing a paste mixture for coating grids for use in making batteries, the process comprising the steps of:
adding a plurality of paste ingredients with a mixer;
driving said mixer with a motor;
monitoring the level of torque produced by said motor, said torque being dependent on the viscosity of said paste ingredients; and
terminating the mixing step when the torque level has reached a predetermined value.

* * * * *